United States Patent
Chirca et al.

(10) Patent No.: US 7,349,938 B2
(45) Date of Patent: Mar. 25, 2008

(54) ARITHMETIC CIRCUIT WITH BALANCED LOGIC LEVELS FOR LOW-POWER OPERATION

(75) Inventors: Kai Chirca, Richardson, TX (US); C. John Glossner, Carmel, NY (US)

(73) Assignee: Sandbridge Technologies, Inc., White Plains, NY (US)

( * ) Notice: Subject to any disclaimer, the term of this patent is extended or adjusted under 35 U.S.C. 154(b) by 300 days.

(21) Appl. No.: 11/070,955

(22) Filed: Mar. 3, 2005

(65) Prior Publication Data
US 2005/0203983 A1   Sep. 15, 2005

Related U.S. Application Data

(60) Provisional application No. 60/550,916, filed on Mar. 5, 2004.

(51) Int. Cl.
G06F 7/50 (2006.01)
(52) U.S. Cl. .................................................. 708/711
(58) Field of Classification Search ......... 708/706–714
See application file for complete search history.

(56) References Cited

U.S. PATENT DOCUMENTS

| | | | |
|---|---|---|---|
| 3,925,652 A * | 12/1975 | Miller | 708/711 |
| 5,278,783 A * | 1/1994 | Edmondson | 708/711 |
| 5,477,480 A * | 12/1995 | Inui | 708/711 |
| 5,745,397 A | 4/1998 | Nadehara | |
| 6,301,600 B1 | 10/2001 | Petro et al. | |
| 2002/0188640 A1 | 12/2002 | Catherwood | |
| 2003/0115237 A1* | 6/2003 | Fletcher | 708/711 |
| 2003/0120901 A1 | 6/2003 | Hokenek et al. | |
| 2005/0060359 A1 | 3/2005 | Schulte et al. | |

FOREIGN PATENT DOCUMENTS

WO   2005/010746 A1   2/2005

* cited by examiner

Primary Examiner—Tan V. Mai
(74) Attorney, Agent, or Firm—Barnes & Thornburg, LLP

(57) ABSTRACT

An adder circuit includes a plurality of adder stages interconnected in series, with a carry out of each of the adder stages other than a final adder stage being coupled to a carry in of a subsequent one of the adder stages. Carry, generate and propagate signals applied to respective inputs of a carry out computation element in at least a given one of the adder stages are substantially balanced in terms of a number of gate delays experienced by the signals within the adder circuit in arriving at their respective inputs of the carry out computation element. Advantageously, this provides significant reductions in both dynamic switching power and short circuit power in the adder circuit.

20 Claims, 4 Drawing Sheets

ARITHMETIC CIRCUIT WITH BALANCED LOGIC LEVELS FOR LOW-POWER OPERATION

RELATED APPLICATION(S)

The present application claims the priority of U.S. Provisional Application Ser. No. 60/550,916, filed Mar. 5, 2004 in the name of inventors K. Chirca et al. and entitled "Method and Apparatus for Balanced Low Power Addition," which is incorporated by reference herein.

FIELD OF THE INVENTION

The present invention relates generally to the field of digital data processors, and more particularly to arithmetic processing operations and associated processing circuitry for use in a digital signal processor (DSP) or other type of digital data processor.

BACKGROUND OF THE INVENTION

Computers or other digital data processors that execute instructions often perform arithmetic operations on input operands to produce result operands, using a two's complement number format. High-performance arithmetic circuits, especially adders and subtractors, are important components in the design of such processors.

A given processor architecture may specify that two numbers are to be added together to produce specific results. For example, the architecture may specify two's complement encoded operands being added or subtracted to produce a two's complement result. Typically, there are multiple admissible implementations that perform the same architectural function. Some examples of admissible implementations of an adder that performs a particular arithmetic function may be a carry look ahead adder, a carry propagate adder, a carry skip adder or a carry save adder.

It is sometimes possible to incorporate different types of adders in different portions of the arithmetic circuit. An example may be an 8-bit carry propagate section followed by an 8-bit carry look ahead section that performs a 16-bit addition.

Additional details regarding these and other conventional aspects of digital data processor arithmetic can be found in, for example, B. Parhami, "Computer Arithmetic: Algorithms and Hardware Designs," Oxford University Press, New York, 2000 (ISBN 0-19-512583-5), which is incorporated by reference herein.

Different arithmetic circuit implementations are developed to optimize various design parameters. Some important design parameters include propagation delay, area utilization, and power dissipation. Most adder implementations tend to trade off performance and area. Occasionally dynamic switching power, described in greater detail below, is considered in the design process.

Active power dissipation in circuit designs can be generally categorized as dynamic switching power and short circuit power. Dynamic switching power is dissipated when a transistor switches state (e.g., from 0->1 or 1->0). Short circuit power is transient in nature. It is manifest by either multiple transitions during switching due to skews between input signals or by transient state changes propagated by input signals that ultimately quiesce to a state that would not induce a transition.

A drawback of conventional arithmetic circuit implementations is that such implementations fail to adequately address the issues of dynamic switching power and short circuit power. This can lead to excessive power consumption, which is problematic in numerous digital data processor applications.

Accordingly, techniques are needed which can provide improved arithmetic circuitry performance, through reductions in dynamic switching power and short circuit power.

SUMMARY OF THE INVENTION

The present invention in an illustrative embodiment provides a low-power adder circuit which exhibits reduced dynamic switching power and short circuit power.

In accordance with one aspect of the invention, an adder circuit comprises a plurality of adder stages interconnected in series, with a carry out of each of the adder stages other than a final adder stage being coupled to a carry in of a subsequent one of the adder stages. Carry, generate and propagate signals applied to respective inputs of a carry out computation element in at least a given one of the adder stages are substantially balanced in terms of a number of gate delays experienced by said signals within said adder circuit in arriving at their respective inputs of the carry out computation element.

In the illustrative embodiment, the adder circuit comprises a 32-bit adder circuit configured to sum a pair of input operands in two's complement format. The 32-bit adder circuit comprises four stages, namely, a first four-bit stage, a six-bit stage, an 18-bit stage, and a second four-bit stage, arranged sequentially from a lowest order bit to a highest order bit of the adder circuit. The stages in this particular embodiment are carry skip stages, but other types of stages may be used in other embodiments.

In each stage of the illustrative embodiment, the number of gate delays associated with the inputs to a carry generation process are substantially equalized. For example, a carry signal applied to a carry out computation element of the first four-bit stage has a critical path delay corresponding to two gate delays, and generate and propagate signals applied to the carry out computation element of the first four-bit stage also have critical path delays corresponding to two gate delays. Similarly, a carry signal applied to a carry out computation element of the second four-bit stage has a critical path delay corresponding to five gate delays, and generate and propagate signals applied to the carry out computation element of the second four-bit stage also have critical path delays corresponding to five gate delays. Thus, the stages are designed in a manner that balances the levels of logic used in each of the stages, such that short circuit power is minimized.

DETAILED DESCRIPTION OF THE INVENTION

The present invention will be described herein in the context of an illustrative embodiment of a 32-bit low-power adder circuit comprising multiple carry skip blocks. It should be understood, however, that the invention does not require the particular arrangements shown, and can be implemented using other types of adder block configurations, bit lengths, number formats and arithmetic circuitry.

A given adder circuit as described herein may be implemented as part of a digital data processor comprising one or more integrated circuits.

The 32-bit adder circuit in the illustrative embodiment performs two's complement addition on 32-bit numbers with balanced logic levels in each of a plurality of stages for reduced power operation. As noted above, the primary components of active power in circuit designs are dynamic switching power and short circuit power, but conventional designs fail to adequately address these components. The present invention in the illustrative embodiment provides an arrangement which minimizes dynamic switching power with particular attention to short circuit power.

Generally, the adder circuit in the illustrative embodiment is divided into multiple stages having different bit widths. In each stage, the number of gate delays associated with the inputs to a carry generation process are substantially equalized. Thus, the stages are designed in a manner that balances the levels of logic used in each of the stages. Short circuit power is minimized because all required signals at the input of the carry generation process within a given stage arrive at substantially the same time. Advantageously, this decreases the total active power dissipated in the adder circuit.

Figure 1:
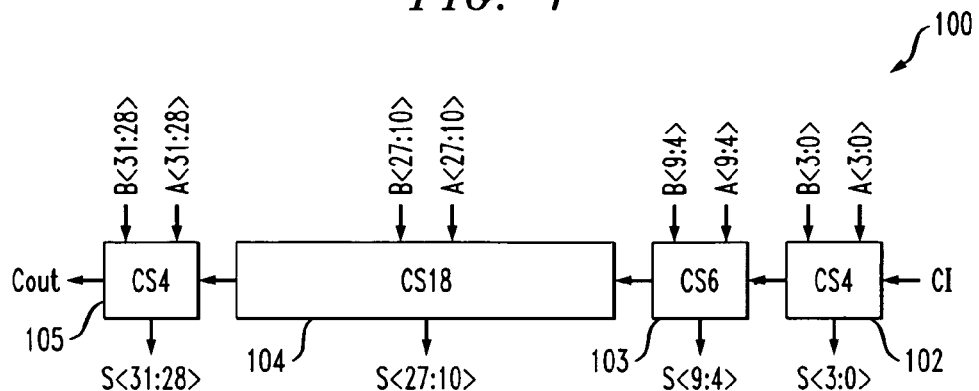
FIG. 1 is a block diagram of an illustrative embodiment of a 32-bit low-power adder circuit in accordance with the invention.

FIG. 1 shows a 32-bit low-power adder circuit 100 in accordance with the illustrative embodiment of the invention. The adder circuit 100 comprises four stages, namely, stages 102, 103, 104 and 105, which comprise carry skip adders of different bit widths cascaded together to form a 32-bit adder. More specifically, the stages 102, 103, 104 and 105 comprise a four-bit carry skip adder (CS4), a six-bit carry skip adder (CS6), an 18-bit carry skip adder (CS18), and another four-bit carry skip adder, respectively.

The adder circuit 100 as shown in FIG. 1 may be viewed as representing at least a portion of an arithmetic logic unit of a multithreaded processor or other digital data processor. As noted above, such processors may be implemented in the form of integrated circuits.

In the adder circuit 100, a carry out of each of the adder stages other than a final adder stage is coupled to a carry in of a subsequent one of the adder stages. The left-most arrow on each carry skip stage in the diagram of FIG. 1 represents the carry out of that stage, and in the case of the first three stages 102, 103 and 104 is connected to the carry in of the subsequent carry skip stage. The carry in CI of the first stage 102 is not utilized in this embodiment. The carry out Cout of the final stage 105 represents the carry out of the 32-bit addition performed by the adder circuit 100. It is a unique feature of the adder circuit 100 that the stages 102, 103, 104 and 105 utilize carry skip logic, but the output carry utilizes carry look ahead logic. It is to be appreciated, however, that this particular feature of the adder circuit 100 is not a requirement of the invention. Also, as those skilled in the art will readily appreciate, different types of stages other than carry skip stages may be used in alternative embodiments.

The adder circuit 100 in this embodiment sums a pair of 32-bit input operands A[31:0] and B[31:0] in two's complement format to produce a 32-bit sum S[31:0] and the carry out Cout. The particular portions of the input operands A and B supplied to respective inputs of the adder stages 102, 103, 104 and 105, and the portions of the sum S generated by those stages, are shown in the figure.

Detailed schematic diagrams of the stages 102, 103, 104 and 105 are shown in FIGS. 2, 3, 4 and 5, respectively. In each of these diagrams, critical path depths for carry, propagate and generate signals are shown in parentheses after the signal name. The critical path depth for a given signal generally indicates the number of gate delays within the stage that are required to generate that signal. Certain signal names in the case of the carry input and output signals as shown in the figures may include, in addition to a number, an indication of "in" or "out" where appropriate for clarity of description.

Figure 2:
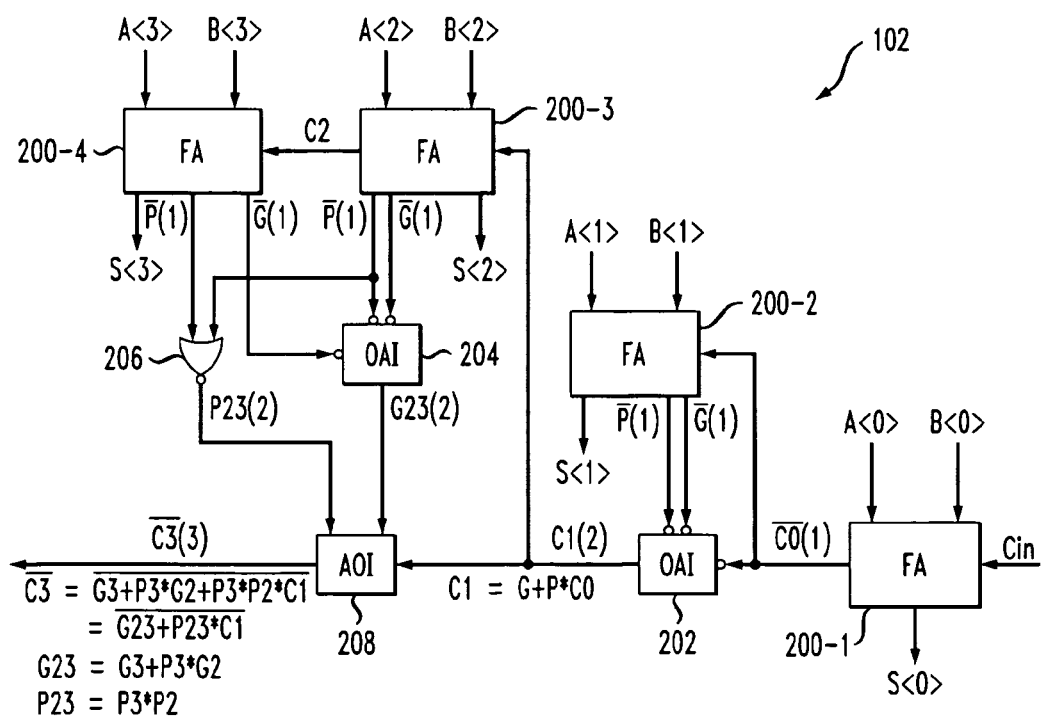
FIGS. 2, 3, 4 and 5 are schematic diagrams of respective first, second, third and fourth carry skip blocks of the adder circuit of FIG. 1.

Referring now to FIG. 2, a more detailed view of the first four-bit carry skip stage 102 of adder circuit 100 is shown. Stage 102 comprises four one-bit full adder (FA) blocks 200-1, 200-2, 200-3 and 200-4, each performing an addition operation for a pair of bits, one from each of the input operands A and B, and producing a corresponding bit of the sum S. Stage 102 further comprises Or-And-Invert (OAI) blocks 202 and 204, two-input NOR gate 206 and And-Or-Invert (AOI) block 208, interconnected as shown.

The first FA block 200-1 receives the least significant bits A[0] and B[0] of the respective two's complement operands A and B. This FA block produces the first output sum bit S[0] and an inverted carry out bit C0-bar which takes one gate delay to generate. The inverted carry out bit C0-bar thus has a critical path depth of one, as indicated in parentheses after the signal name in the figure. This carry out bit is input into the second FA block 200-2 and the OAI block 202 along the carry chain. The carry out bit Ci for the ith bit position is expressed as:

$$Ci = Gi + Pi \cdot Ci-1 \quad (1)$$

where $$Gi = Ai \cdot Bi \text{ generate signal} \quad (2)$$

$$Pi = Ai + Bi \text{ propagate signal} \quad (3)$$

Expanding this yields:

$$Ci = Gi + Pi \cdot Gi-1 + Pi \cdot Pi-1 \cdot Gi-2 + \ldots + Pi \ldots P1 \cdot C0 \quad (4)$$

Therefore, inverted G1 and P1 in stage 102 also take one gate delay. And all three inputs of the OAI block 202 have the same gate delay. That block produces C1 and feeds it into the AOI block along the carry chain. Since the inputs of this level of carry generation are not inverted, instead of changing the polarities of the inputs, the complementary logic, AOI, is used to simplify the logic levels.

As indicated in the figure, it takes a two-gate delay to produce the carry out of the first two bits, C1. From equation (4), the carry out C3 may be written as:

$$\begin{aligned}
C3 &= G3 + P3 \cdot G2 + P3 \cdot P2 \cdot G1 + P3 \cdot P2 \cdot P1 \cdot G0 + \\
&\quad P3 \cdot P2 \cdot P1 \cdot P0 \cdot CI \\
&= G3 + P3 \cdot G2 + P3 \cdot P2 \cdot (G1 + P1 \cdot G0 + P1 \cdot P0 \cdot CI) \\
&= G3 + P3 \cdot G2 + P3 \cdot P2 \cdot C1 \\
&= G23 + P23 \cdot C1
\end{aligned} \quad (5)$$

The generate and propagate signals G23 and P23 applied to AOI block 208 each take a two-gate delay, and thus have a critical path depth which matches that of the other input C1 of the AOI block.

Figure 3:
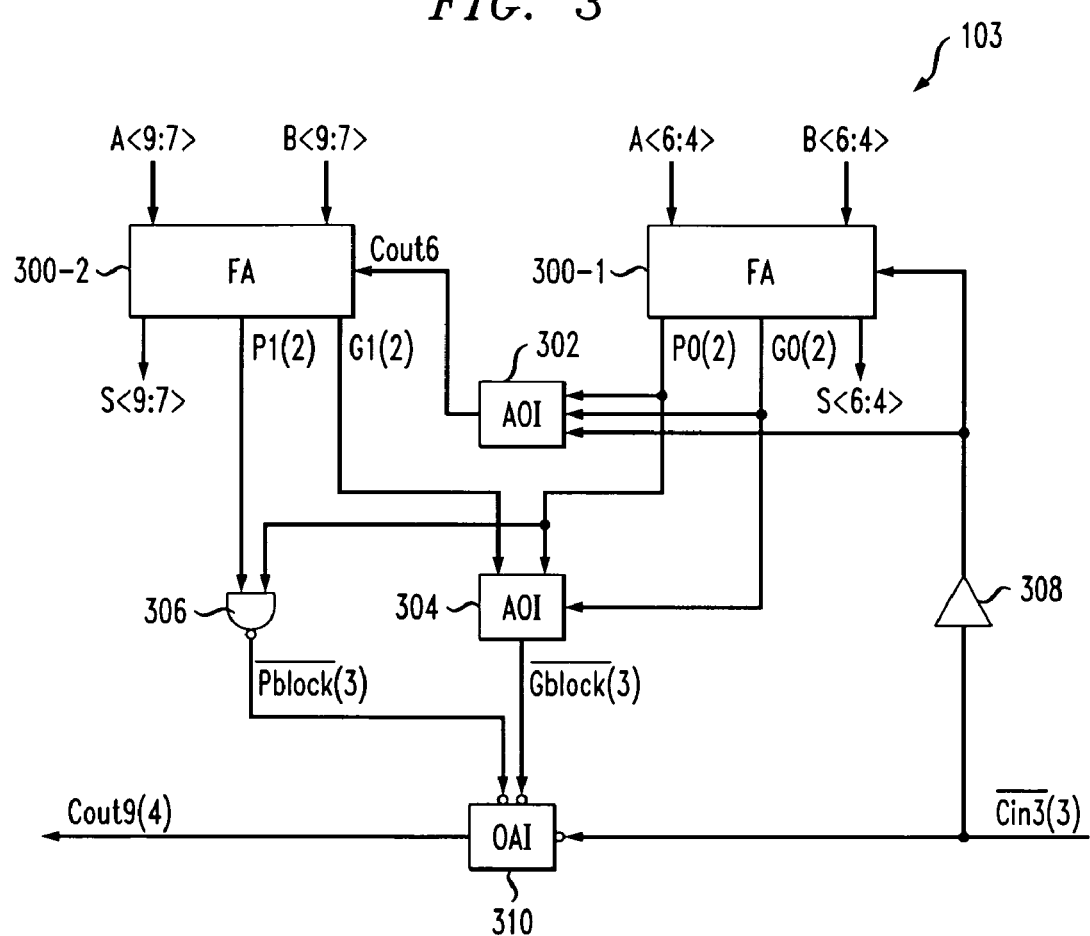

FIG. 3 shows a more detailed view of the six-bit carry skip stage 103 of adder circuit 100. The stage 103 comprises two three-bit FA blocks 300-1 and 300-2, AOI blocks 302 and 304, NAND gate 306, gate 308 and OAI block 310, interconnected as shown.

In the stage 103, the propagate and generate signals input to OAI block 310 from respective NAND gate 306 and AOI block 304 each consume three gate delays, which matches the critical path depth of the carry input Cin3 from the previous stage. Since the inputs of the final carry computation in stage 103 are inverted, OAI block 310 is used to produce the carry out Cout9 without polarity switching along the carry chain. This is similar to the arrangement used in the first portion of stage 102 of FIG. 2.

The carry in Cin3 ripples through the three-bit FA blocks 300 at the top of the figure and is utilized to generate the sums. In order to increase the speed of the sum generation in the second FA block 300-2, the propagate and generate signals P0 and G0 of the first three-bit FA block 300-1 are fed together with the carry in Cin3 to AOI block 302 produce the carry in of the second three-bit FA block 300-2. Therefore, the sum generation of this second FA block does not wait for the carry in to ripple all the way through, but instead receives a locally-generated "skipped" carry in.

Figure 4:
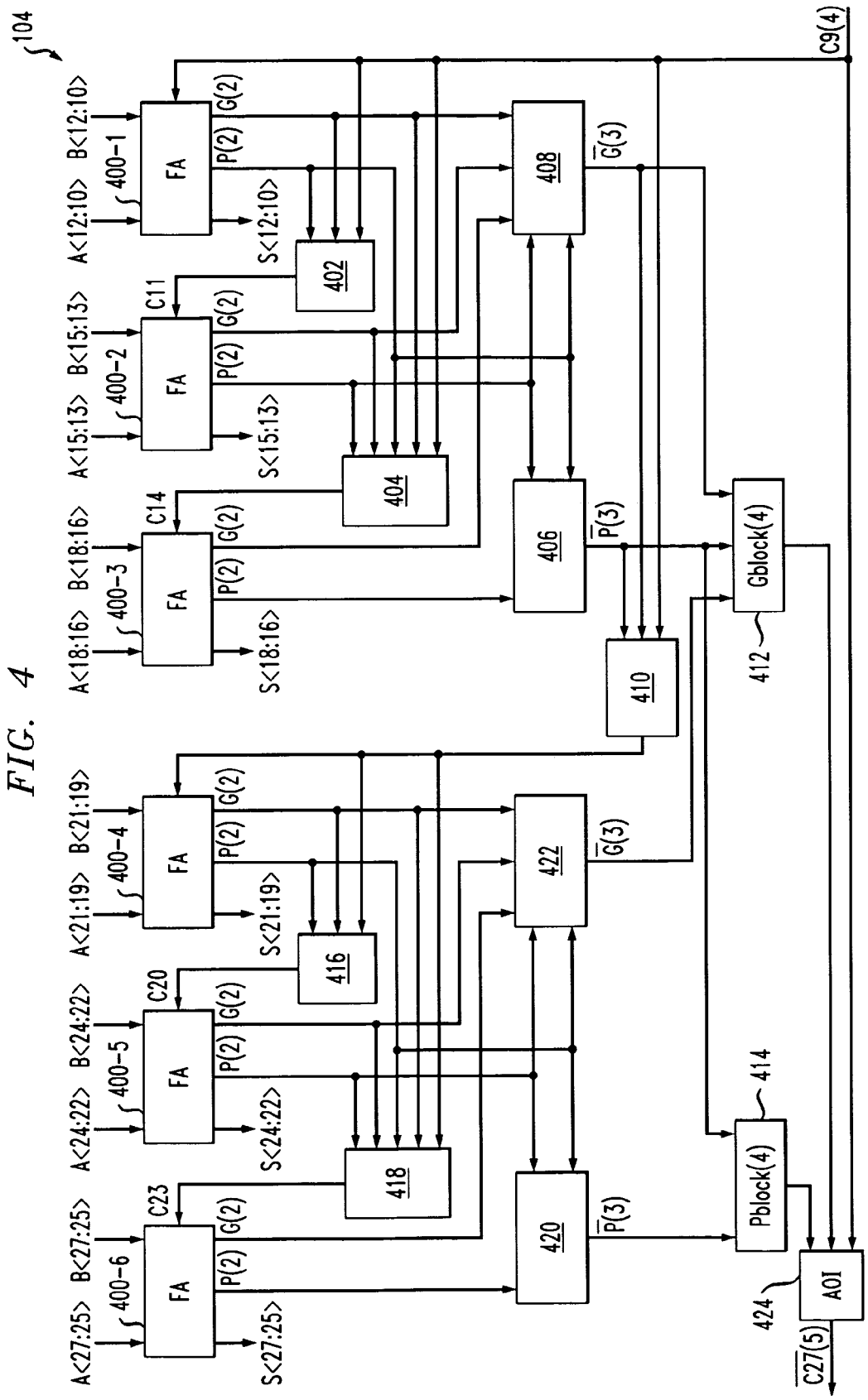

Referring now to FIG. 4, a more detailed view of the 18-bit carry skip stage 104 of adder circuit 100 is shown. The stage 104 comprises six three-bit FA blocks 400-1 through 400-6, carry computation blocks 402, 404, 410, 416 and 418, propagate blocks 406, 414 and 420, and generate blocks 408, 412 and 422, and AOI block 424, interconnected as shown.

To match the carry in C9 along the carry chain, more bits can be merged to generate the global generate and propagate signals Gblock and Pblock in respective blocks 412 and 414. Since C9 has four gate delays, an additional level of generate-propagate computation is added in stage 104. This additional level is provided by the blocks 412 and 414. The configuration of the upper level of logic provided by FA blocks 400 is similar to that of the previous stage 103. The local carry out generation in this portion of the stage follows the same skipping rule, but with increased levels of logic as well to provide the required matching of critical path depth at the inputs to the AOI block 424.

Figure 5:
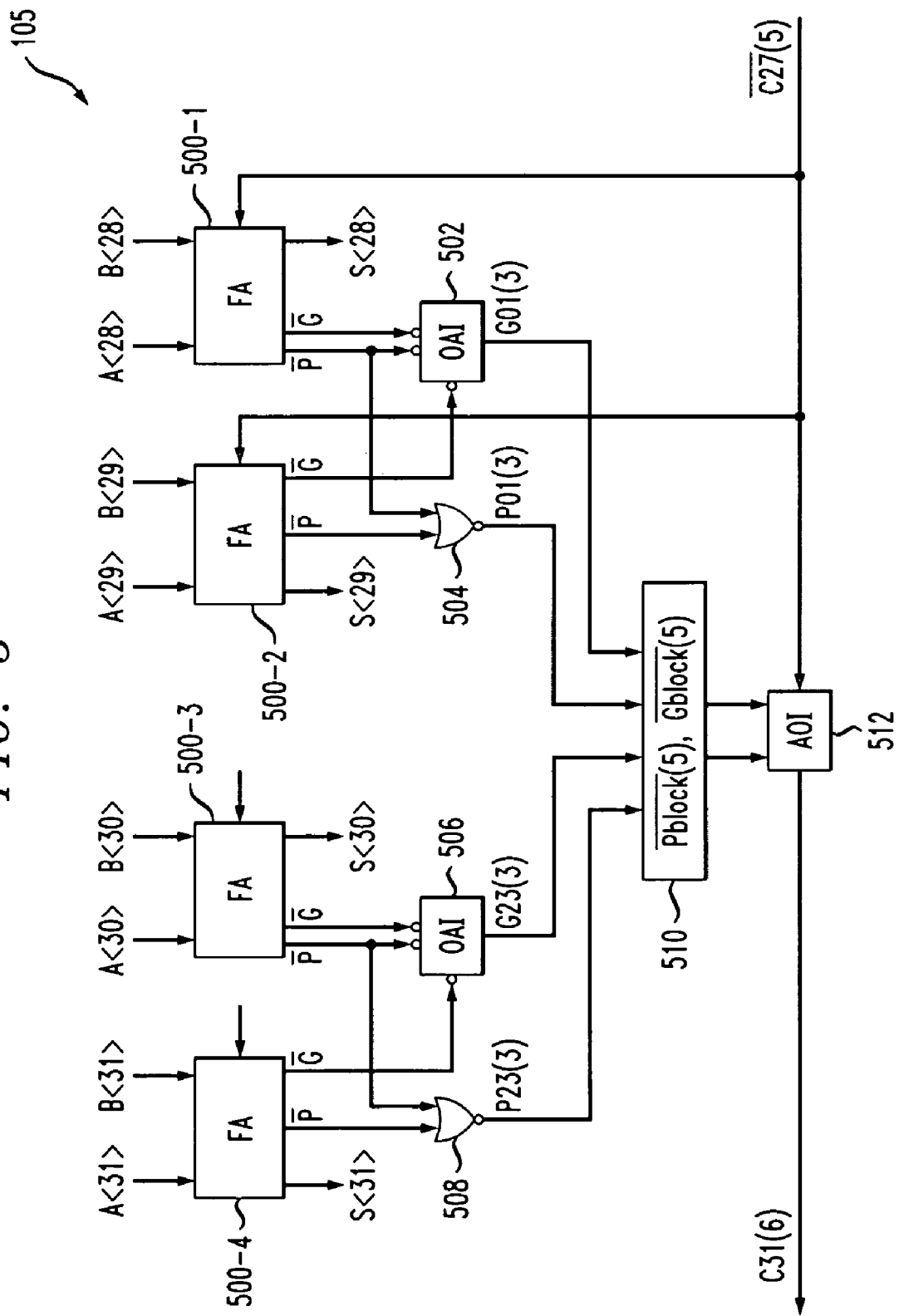

FIG. 5 shows the final 4-bit carry skip stage 105 of adder circuit 100. The stage 105 comprises four one-bit FA blocks 500-1, 500-2, 500-3 and 500-4, OAI blocks 502 and 506, NOR gates 504 and 508, computation block 510, and AOI block 512.

In order to match the critical path depth of the carry in C27, the generate-propagate circuitry has additional logic levels to consume. Therefore, XOR logic is used in these blocks to implement the propagate signal instead of using OR logic. This logic is also shared by the sum generators. Therefore, three levels of generate-propagate generation use up five gate delays matching, thereby matching the gate delays of the carry in C27. In order to provide fast sum generation, the carry in C27 is brought into each of the four one-bit FA blocks 500.

Using the techniques described above, all inputs to the carry computation process in a given can be balanced in terms of gate delays. The representative 32-bit adder described above balances such signals over multiple levels of logic circuitry to provide the desired matching of gate delays at the point of carry generation in each stage. As a result of the balancing, all signals required to generate a particular carry out arrive at approximately the same time into the computational element that performs the operation. Advantageously, this avoids transient switching of transistor circuits and reduces the short circuit power of the adder circuit 100.

It should be understood that the particular adder design shown in FIGS. 1 through 5 is presented by way of illustrative example only. Numerous alternative reduction adder designs may be used, and the particular adder selected for use in a given implementation may vary based on application-specific factors such as the format of the input operands. Also, additional or alternative elements not explicitly shown may be included, as will be apparent to those skilled in the art.

As indicated previously, the present invention can be implemented in a digital data processor comprising one or more integrated circuits. For example, the invention can be advantageously implemented in a multithreaded processor. A more particular example of a multithreaded processor in which the invention may be implemented is described in U.S. patent application Ser. No. 10/269,372, filed Oct. 11, 2002 and entitled "Multithreaded Processor With Efficient Processing For Convergence Device Applications," which is commonly assigned herewith and incorporated by reference herein.

The 32-bit low-power adder as described herein may be implemented in an arithmetic logic unit in such a multithreaded processor. Of course, the invention can be implemented in other multithreaded processors, or more generally other types of digital data processors.

Again, the above-described embodiments of the invention are intended to be illustrative only, and numerous alternative embodiments within the scope of the appended claims will be apparent to those skilled in the art. For example, the particular logic circuitry, number of levels, stage types and configurations, and other aspects of the illustrative embodiments may be altered in other embodiments. These and other alternative arrangements within the scope of the appended claims will be readily apparent to those skilled in the art.

What is claimed is:

1. An adder circuit comprising:
   a plurality of adder stages interconnected in series, a carry out of each of the adder stages other than a final adder stage being coupled to a carry in of a subsequent one of the adder stages;
   wherein carry, generate and propagate signals applied to respective inputs of a carry out computation element in at least a given one of the adder stages are substantially balanced in terms of a number of gate delays experienced by said signals within said adder circuit in arriving at their respective inputs of the carry out computation element, and wherein the adder circuit processes data received via at least two inputs through the plurality of adder stages to produce an output signal output from an output of the final adder stage, such that the adder circuit exhibits minimized dynamic switching power and short circuit power in processing the data received via the at least two inputs.

2. The adder circuit of claim 1 wherein said carry out computation element comprises an and-or-invert block.

3. The adder circuit of claim 1 wherein said carry out computation element comprises an or-and-invert block.

4. The adder circuit of claim 1 wherein a number of logic levels of the given adder stage utilized to compute the generate and propagate signals applied to the carry out computation element is the same as a critical path depth of the carry signal applied to the carry out computation element.

5. The adder circuit of claim 1 wherein the carry signal comprises a carry in of the given adder stage.

6. The adder circuit of claim 1 wherein in each of the plurality of adder stages, corresponding carry, generate and propagate signals applied to respective inputs of a carry out computation element of the adder stage are substantially balanced in terms of a number of gate delays experienced by said signals within said adder circuit in arriving at their respective inputs of the carry out computation element.

7. The adder circuit of claim 1 wherein the adder circuit sums a pair of input operands in two's complement format.

8. The adder circuit of claim 1 wherein the adder circuit comprises a 32-bit adder circuit.

9. The adder circuit of claim 8 wherein the adder circuit comprises a four-stage adder circuit.

10. The adder circuit of claim 9 wherein the adder circuit comprises four stages including a first four-bit stage, a six-bit stage, an 18-bit stage, and a second four-bit stage, arranged sequentially from a lowest order bit to a highest order bit of the adder circuit.

11. The adder circuit of claim 10 wherein a carry signal applied to a carry out computation element of the first four-bit stage has a critical path delay corresponding to two gate delays, and generate and propagate signals applied to the carry out computation element of the first four-bit stage also have critical path delays corresponding to two gate delays.

12. The adder circuit of claim 10 wherein a carry signal applied to a carry out computation element of the six-bit stage has a critical path delay corresponding to three gate delays, and generate and propagate signals applied to the carry out computation element of the six-bit stage also have critical path delays corresponding to three gate delays.

13. The adder circuit of claim 10 wherein a carry signal applied to a carry out computation element of the 18-bit stage has a critical path delay corresponding to four gate delays, and generate and propagate signals applied to the carry out computation element of the six-bit stage also have critical path delays corresponding to four gate delays.

14. The adder circuit of claim 10 wherein a carry signal applied to a carry out computation element of the second four-bit stage has a critical path delay corresponding to five gate delays, and generate and propagate signals applied to the carry out computation element of the second four-bit stage also have critical path delays corresponding to five gate delays.

15. The adder circuit of claim 1 wherein the adder circuit is implemented as part of an integrated circuit.

16. The adder circuit of claim 1 wherein the adder circuit comprises an arithmetic element of a digital data processor.

17. A method for implementing an adder circuit incorporated in a digital signal processor, the adder circuit comprising a plurality of adder stages interconnected in series, a carry out of each of the adder stages other than a final adder stage being coupled to a carry in of a subsequent one of the adder stages, the method comprising:

applying carry, generate and propagate signals to respective inputs of a carry out computation element in at least a given one of the adder stages; and utilizing the applied carry, generate and propagate signals to compute a carry out of the given adder stage;

wherein the carry, generate and propagate signals are substantially balanced in terms of a number of gate delays experienced by said signals within said adder circuit in arriving at their respective inputs of the carry out computation element, wherein the adder circuit processes data received via at least two inputs through the plurality of adder stages to produce an output signal output from an output of the final adder stage, such that the adder circuit exhibits minimized dynamic switching power and short circuit power in processing the data received via the at least two inputs.

18. The method of claim 17 wherein the carry signal comprises a carry in of the given adder stage.

19. The method of claim 17 wherein in each of the plurality of adder stages, corresponding carry, generate and propagate signals applied to respective inputs of a carry out computation element of the adder stage are substantially balanced in terms of a number of gate delays experienced by said signals within said adder circuit in arriving at their respective inputs of the carry out computation element.

20. An integrated circuit comprising at least one processor, the processor comprising:

at last one arithmetic unit;

the arithmetic unit comprising at least one adder circuit;

the adder circuit comprising a plurality of adder stages interconnected in series, a carry out of each of the adder stages other than a final adder stage being coupled to a carry in of a subsequent one of the adder stages;

wherein carry, generate and propagate signals applied to respective inputs of a carry out computation element in at least a given one of the adder stages are substantially balanced in terms of a number of gale delays experienced by said signals within said adder circuit in arriving at their respective inputs of the carry out computation element, and wherein the adder circuit processes data received via at least two inputs through the plurality of adder stages to produce an output signal output from an output of the final adder stage, such that the adder circuit exhibits minimized dynamic switching power and short circuit power in processing the data received via the at least two inputs.

* * * * *